April 7, 1936.  F. G. LOGAN  2,036,708

ELECTRIC CONTROLLING APPARATUS

Filed Aug. 8, 1932

INVENTOR
Frank G. Logan
BY
Lawrence K. Sager
his ATTORNEY

Patented Apr. 7, 1936

2,036,708

UNITED STATES PATENT OFFICE 2,036,708

ELECTRIC CONTROLLING APPARATUS

Frank G. Logan, Mount Vernon, N. Y., assignor to Ward Leonard Electric Company, a corporation of New York Application August 8, 1932, Serial No. 627,841

16 Claims. (Cl. 175—363)

This invention relates to an improved method and apparatus for controlling the current or voltage of a consumption circuit over a wide range and where the source of energy is alternating current and the load is a direct current load. The load may be of any character, such as a lamp load or power load and may be a controlling device of some other apparatus for indirectly controlling a main load for obtaining particular results.

The main object of the invention is to provide an improved method and an improved character of controlling apparatus which will secure the result of controlling the voltage and current of the load circuit over a wide range in an efficient manner and by the use of comparatively simple and inexpensive controlling apparatus. Another object is to accomplish this result by the use of apparatus which will be durable and reliable in long continued use. Another object is to permit the use of a comparatively small amount of controlling energy for securing the desired range of control of energy in the load circuit, permitting the adjustable device or devices to be conveniently located at a point remote from the main apparatus without appreciable losses and with simplicity of connections. Other objects and advantages will be understood by those skilled in the art from the following description and accompanying drawing.

Figure 1:
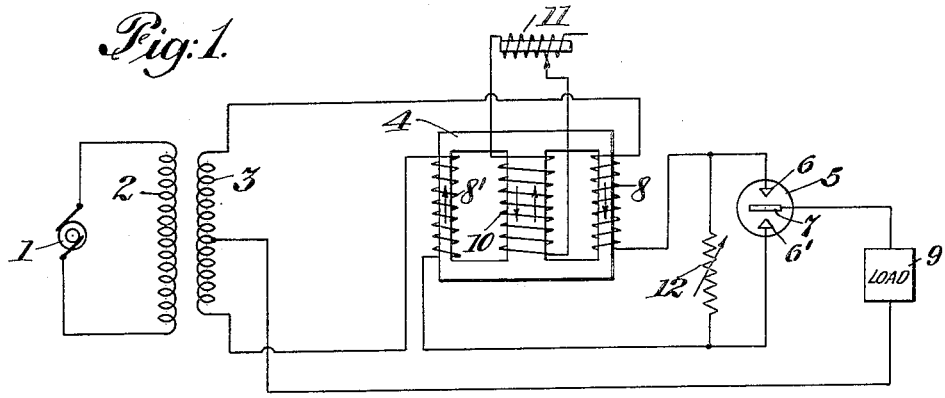
Figure 2:
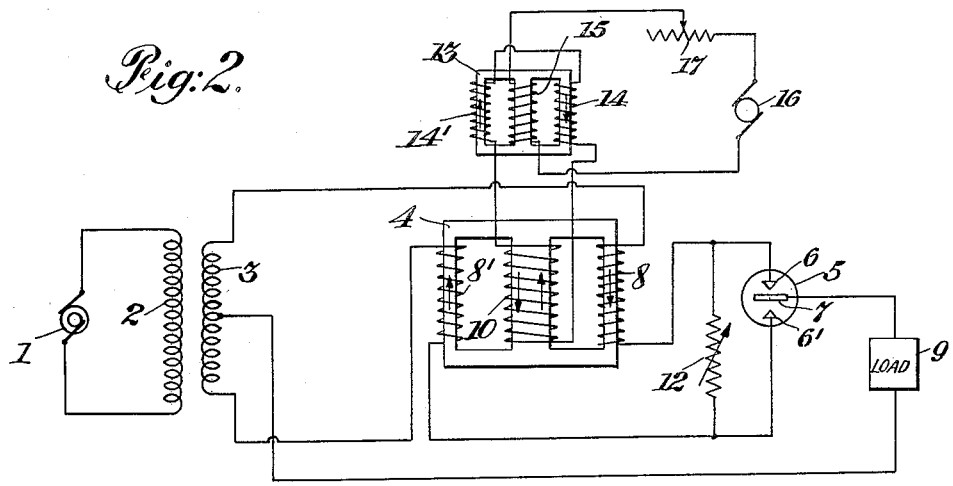
Figure 3:
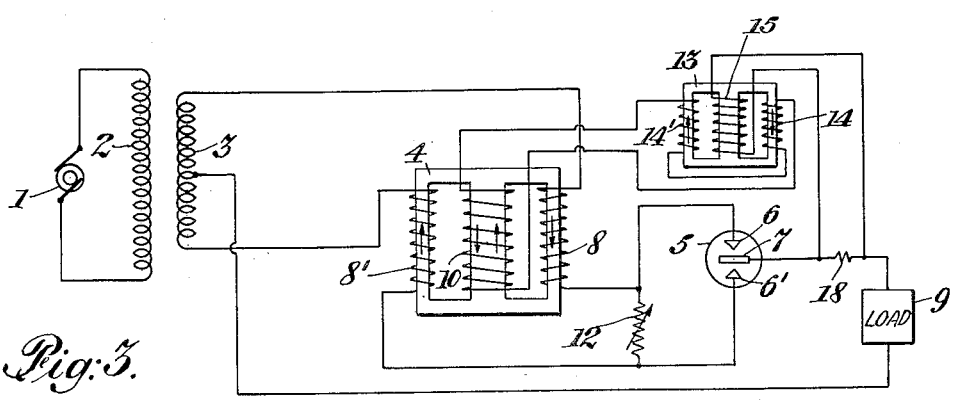

Fig. 1 is a diagram showing one embodiment of the invention; Fig. 2 is a diagram showing a modification thereof and Fig. 3 is a diagram showing another embodiment of the invention illustrating a further modification.

Referring to Fig. 1 an alternating current source 1 is shown supplying the primary 2 of a transformer having a secondary winding 3; and also a reactor having a laminated core 4 of the three-legged type with cross-pieces joining the ends together. A full-wave rectifier 5 which may be of any type or form is shown having anodes 6 and 6' and a cathode 7. On one of the outer legs of the reactor is a winding 8 connected between one terminal of the secondary winding 3 of the transformer and the anode 6 of the rectifier. On the other outer leg of the reactor is a winding 8' connected between the other terminal of the secondary winding 3 and the anode 6' of the rectifier. In this form of core the connection and relationship of the turns of these two windings 8 and 8' should be such as to tend to cause the flux set up by current through them, to be in the same direction in the core with reference to each other as indicated by the arrow on the left-hand leg pointing upwardly and the arrow on the right-hand leg pointing downwardly, with the result that the direction of the flux through the central leg of the core due to the winding 8' would be downward and the direction of the flux due to the winding on the right-hand leg would be upward through the central leg of the core. Thus the central leg is subjected to a flux due to these windings first in one direction and then in the opposite direction, as indicated by the arrows on the central leg of the drawing. The circuit from these windings through the rectifier continues to the cathode 7 and then through the load 9 and thence to a mid-point of the secondary winding 3.

On the central leg of the reactor is a winding 10 which is in a closed circuit on itself except for some means, such as the variable inductance device 11, for adjusting the value of the induced current in the winding 10.

Connected in a shunt circuit around the rectifier anodes is a resistance or impedance device 12 which for some purposes may be of a fixed value, but may be adjustable when desired for securing increased range of control of the load voltage and current. This shunting impedance device is disclosed in various relationships to other apparatus and broadly claimed in my pending application Serial Number 535,600, filed May 7, 1931.

When in operation, a direct current is supplied to the load 9 by means of the full-wave rectifier, the windings 8 and 8' being alternately active in passing the current through the rectifier and load in the same direction. If it be assumed that the inductive device 11 in the circuit of the coil 10 has a very high impedance, it is evident that the alternate change in flux through the central leg of the reactor core would cause very little current to pass in the circuit of winding 10.

Under such conditions this small current through the winding 10 would have no appreciable magnetic effect on the core 4 of the reactor and its reactance as regards the windings 8, 8' would be at a maximum. The counter electro-motive force induced in these windings would consequently be at a maximum, resulting in a minimum electro-motive force being applied to the load 9 and a minimum current passing in the load circuit. If the device 11 be adjusted to have a lower value, it is evident that this would permit the passage of a larger current in the winding 10 and its circuit. The passage of this increased current would so affect the resultant flux in the core as to reduce the reactance of coils 8 and 8', cutting down the counter electro-motive force induced in the windings 8 and 8' and thereby permitting an increased electro-motive force to be applied to the load and cause an increase of current in the load circuit. By adjustment of the device 11 to be of minimum value, the coil 10 would have a greatly increased current induced therein, owing to its circuit being of comparatively low impedance. The passage of this large induced current through the winding 10 would correspondingly reduce the reactance of the windings 8 and 8' so that the counter electro-motive force induced in these windings would be of a minimum value and result in subjecting the rectifier and the load circuit to the maximum voltage and current.

In describing the operation thus far, the presence of the resistance or impedance device 12 has been ignored, but this has the effect of co-operating with the reactor control to give an increased effect and to amplify the range of control of the voltage applied to the load.

This shunting impedance serves to cause an auxiliary current to pass through the windings 8, 8' during the alternate periods when those windings are inactive in supplying current to the load circuit. Considering the winding 8 and assuming that this supplies current to the load in a given direction which we may call positive, then during the alternate non-active periods of this winding, the impedance device 12 will cause a current, which may be of a comparatively small amount, to pass through the winding 8 in the reverse direction. This will be understood because during the alternate periods when the winding 8 is inactive in supplying current to the load, the winding 8' will be active in supplying current to the load and by reason of the shunting impedance 12, a small part of the current supplied by the winding 8' will pass through this shunt and through the winding 8 back to the source in a direction, say negative, and opposite to that of the current through the winding 8 when it is supplying current to the load. The conditions thus set up in the winding 8 and its core, as regards flux and energy conditions, tend to establish in greater or lesser degree, as determined by the value of the impedance 12, the conditions which would exist if the winding 8 and its core had not been subjected to an inactive condition as regards supply of energy to the consumption circuit. Consequently, when the winding 8 again becomes normally active, the amount of energy and current which this winding is permitted to deliver to the consumption circuit is correspondingly controlled. A similar condition exists with reference to the winding 8' and its core by the controlling effect of the impedance device 12 in causing a controlling current to be passed through the winding 8' in a direction opposite to that of the normal load current therethrough; and this opposite controlling current will pass through the winding 8' during the alternate inactive periods of the winding 8'. It has been found in practice that the controlling current due to the presence of the impedance device 12 is very slight for obtaining the desired effect in the control of the load energy; and also that comparatively small changes of this controlling current result in wide variations in the energy supplied to the load.

The effect of the impedance device 12 together with the winding 10 in controlling the voltage and current of the load circuit will now be considered. Let it be assumed that the inductive device 11 has been adjusted to have maximum value to give minimum voltage and current to the load, in the manner already explained. Although at this time the electro-motive force applied to the terminals of the device 12 is a minimum, the sensitivity of the magnetic circuit including windings 8 and 8' is at a maximum, considering the effect of control current passed by impedance 12. When the inductive device 11 is adjusted to have its minimum effect in the circuit of the winding 10 in order to give high voltage and current to the load, the voltage applied to the device 12 will be correspondingly increased so that it results in passing an increased current through the windings 8 and 8' during their alternate inactive periods. This is not objectionable, as the reactance of windings 8 and 8' is then at a minimum and the added control current has little effect.

In describing the effect of the device 12 with the control obtained by the winding 10 and change of the inductance of its circuit, it has thus far been assumed that the impedance device 12 has remained of a fixed value; and in such an event the results obtained have proved to be quite advantageous. In some cases, where a further range of control is desired, this may be obtained by making the impedance 12 adjustable. Thus under conditions of minimum load, the impedance 12 would be adjusted to have a comparatively low value so that the shunt current passing through this device and through the windings 8 and 8' during their alternate inactive periods, would be relatively great, thus causing the device 12 to have its maximum effect on the load output at that time. When the controlling device 11 is adjusted to give increased output to the load, then the impedance 12 may be adjusted to have an increased value so as to cause the amount of current passing through the windings 8 and 8' during their inactive periods to have a lower value. Thus the load output will be increased over that which would occur if the impedance device 12 were not adjusted to a higher value. And, for attaining maximum output, the impedance device 12 would be increased to a maximum value while the inductive device 11 would be reduced to its minimum value. Thus where an extreme range of control is desired, both of the controlling devices should be preferably made adjustable.

Fig. 2 is similar to Fig. 1 except that the adjustable inductive device 11 which serves as a control load for the winding 10, is replaced by another form of control. Thus a three-legged laminated core 13 is provided with windings 14 and 14' on the outer legs and are connected in series with each other and with the control winding 10. The windings 14, 14' are connected to cause the flux due to them to be in the same direction as each other around the outer legs and crosspieces of the core and in opposite direction as regards the passage of their flux through the central leg of the core. On the central leg is a direct current winding 15 which is excited from any suitable direct current source such as 16 with adjustable means such as 17 to control the current in winding 15 between desired limits. The change of direct current in the winding 15 will, of course, vary the reactance of the windings 14 and 14' which latter now form the control load of the winding 10. Thus the reactive effect of the winding 10 in control of the reactance of the windings 8 and 8' will be adjusted to desirable amounts by change of current in the direct current winding 15. This embodiment of the invention has the advantage of securing refined and smooth adjustment of the control load of the winding 10 and likewise has the advantage of providing a control circuit having small watt losses.

Fig. 3 shows a modification of the invention wherein the control load of the winding 10 is automatically affected. The parts are similar to those shown in Fig. 2, except that the means for control of the current in the winding 15 is replaced by connections to cause the current in winding 15 to increase or decrease when the main load on the apparatus is increased or decreased. Thus the terminals of the winding 15 are shown connected to be in series with the circuit of the load 9, a small shunting resistance 18 being connected in series in the load circuit and in parallel with the winding 15 so that this winding will receive such proportional part of the load current as to produce the desired controlling effect. In this embodiment of the invention the impedance device 12 is necessarily adjustable. As to the operation of the disclosure of Fig. 3, it will be apparent from the foregoing explanations that when the device 12 is adjusted to have its minimum value, this in itself tends to reduce the value of the load current. With a small load current, the winding 15 will similarly be subjected to a small current and, as already explained in connection with Fig. 2, this results in the control winding 10 affecting the windings 8 and 8' to cause the load to receive its minimum current and voltage. When the impedance device 12 is adjusted to a higher value the increased load current will, of course, cause the current in the winding 15 to be increased which in turn causes the windings 14 and 14' to have less inductive effect in the circuit of the winding 10 which permits an increased current to flow in the winding 10 and, as already explained, reduces the reactance of the windings 8 and 8' to permit an increased voltage and current to be applied to the load 9. Thus as the value of the impedance device 12 is raised, the controlling effect of the winding 10 automatically responds in a cumulative manner to affect the current to which the load 9 is subjected.

Various other modifications and applications of this invention may be made without departing from the scope thereof. Also any type or form of rectifying means may be used and any suitable forms of reactive devices may be used for securing the controlling effects with cores of various forms and with the windings variously related and, depending on the form of the reactor core and relationship of the windings and results desired, the shunting impedance device 12 may sometimes be omitted. The invention is also obviously applicable to a polyphase alternating current source.

I claim:

1. The combination of a reactor having a winding thereon adapted to be supplied from an alternating current source, rectifying means receiving energy from said winding and supplying energy to a consumption circuit, a second winding on said reactor subjected to change of flux due to said first-named winding, means in the circuit of the last-named winding for adjusting the inductance of said circuit, and means for passing current through said first-named winding during the respective alternate non-conducting periods of the supply current wave.

2. The combination of a reactor having windings thereon adapted to be supplied from an alternating current source and creating a flux in one portion of the core of said reactor to pass in opposite directions through said portion, rectifying means receiving energy from said windings and supplying energy to a consumption circuit, a winding on said portion of the core subjected to said flux in opposite directions, means in the circuit of said last-named winding for adjusting the inductance of the circuit therethrough, and means for passing current through said first-named windings during the respective alternate non-conducting periods of the supply current wave.

3. The combination of a reactor having windings thereon adapted to be supplied from an alternating current source, rectifying means receiving energy from said windings and supplying energy to a consumption circiut, a winding on said reactor subjected to the changing flux created by said first-named windings for thereby inducing a current in said winding, means in the circuit of said winding for adjusting the value of the current induced in said circuit, and means for passing current through said first-named windings during the respective alternate non-conducting periods of the supply current wave.

4. The combination of a reactor having a winding thereon adapted to be supplied from an alternating current source, rectifying means receiving energy from said winding and supplying energy to a consumption circuit, a second winding on said reactor subjected to change of flux due to said first-named winding, an auxiliary reactor having a winding thereon connected in a closed circuit with said second-named winding, means for adjusting the reactance of said auxiliary reactor, and means for passing current through said first-named winding during the respective alternate non-conducting periods of the supply current wave.

5. The combination of a reactor having a winding thereon adapted to be supplied from an alternating current source, rectifying means receiving energy from said winding and supplying energy to a consumption circuit, a second winding on said reactor subjected to change of flux due to said first-named winding, an auxiliary reactor having a winding thereon connected in a closed circuit with said second-named winding, a winding on said auxiliary reactor for changing the reactance thereof, said last-named winding being related to the consumption circuit to receive current therethrough in accordance with change of current in the load circuit, and means for passing current through said first-named winding during the respective alternate non-conducting periods of the supply current wave.

6. The combination of a reactor having a winding thereon adapted to be supplied from an alternating current source, rectifying means receiving energy from said winding and supplying energy to a consumption circuit, a second winding on said reactor subjected to change of flux due to said first-named winding, means in the circuit of the last-named winding for adjusting the inductance of said circuit, and a shunt path around a circuit containing said rectifying means for permitting flow of current through said first-named winding during the respective alternate non-conducting periods of the supply current wave.

7. The combination of a reactor having windings thereon adapted to be supplied from an alternating current source and creating a flux in one portion of the core of said reactor to pass in opposite directions through said portion, rectifying means receiving energy from said windings and supplying energy to a consumption circuit, a winding on said portion of the core subjected to said flux in opposite directions, means in the circuit of said last-named winding for adjusting the inductance of the circuit thereof, and a shunt path around a circuit containing said rectifying means for permitting flow of current through said first-named windings during the respective alternate non-conducting periods of the supply current wave.

8. The combination of a reactor having windings thereon adapted to be supplied from an alternating current source, rectifying means receiving energy from said windings and supplying energy to a consumption circuit, a winding on said reactor subjected to the changing flux created by said first-named windings for thereby inducing a current in said winding, means in the circuit of said winding for adjusting the value of the current induced in said circuit, and a shunt path around a circuit containing said rectifying means for permitting flow of current through said first-named windings during the respective alternate non-conducting periods of the supply current wave.

9. The combination of a reactor having a winding thereon adapted to be supplied from an alternating current source, rectifying means receiving energy from said winding and supplying energy to a consumption circuit, a second winding on said reactor subjected to change of flux due to said first-named winding, an auxiliary reactor having a winding thereon connected in a closed circuit with said second-named winding, means for adjusting the reactance of said auxiliary reactor, and a shunt path around a circuit containing said rectifying means for permitting flow of current through said first-named winding during the respective alternate non-conducting periods of the supply current wave.

10. The combination of a reactor having a winding thereon adapted to be supplied from an alternating current source, rectifying means receiving energy from said winding and supplying energy to a consumption circuit, a second winding on said reactor subjected to change of flux due to said first-named winding, an auxiliary reactor having a winding thereon connected in a closed circuit with said second-named winding, a winding on said auxiliary reactor for changing the reactance thereof, said last-named winding being related to the consumption circuit to receive current therethrough in accordance with change of current in the load circuit, and a shunt path around a circuit containing said rectifying means for permitting flow of current through said first-named winding during the respective alternate non-conducting periods of the supply current wave.

11. The combination of an alternating current source, a reactor having a winding thereon connected to said alternating current source, rectifying means receiving current from said winding in alternate active periods interposed between alternate inactive periods and supplying energy to a consumption circuit, an inductive winding on said reactor in a closed local circuit subjected to change of flux due to said first-named winding, an auxiliary reactor having a winding thereon connected in the closed circuit with said inductive winding, a winding on said auxiliary reactor for changing the reactance thereof, said last-named winding being related to the consumption circuit to receive current therethrough in accordance with change of current in the load circuit, and additional means for independently adjusting the reactance of said first named reactor.

12. The combination of an alternating current source, a reactor having a winding thereon connected to said alternating current source, rectifying means receiving current from said winding in alternate active periods interposed between alternate inactive periods and supplying energy to a consumption circuit, an inductive winding on said reactor in a closed local circuit subjected to change of flux due to said first-named winding, means in the circuit of said inductive winding affected by change of electrical condition of the consumption circuit for affecting the inductance of the circuit of said inductive winding, and additional means for independently adjusting the reactance of said reactor.

13. The combination of a reactor having a winding thereon adapted to be supplied from an alternating current source, rectifying means receiving energy from said winding in alternate conducting periods interposed between alternate inactive periods and supplying energy to a consumption circuit, an inductive winding on said reactor subjected to change of flux due to said first-named winding for thereby inducing a current in the circuit of said inductive winding, means in the circuit of the last-named winding for adjusting the inductance of said circuit, and means for reversing the flux through said first-named winding during the respective alternate non-conducting periods of the supply current wave.

14. The combination of a reactor having a winding thereon adapted to be supplied from an alternating current source, rectifying means receiving energy from said winding in alternate conducting periods interposed between alternate inactive periods and supplying energy to a consumption circuit, an inductive winding on said reactor subjected to change of flux due to said first-named winding for thereby inducing a current in the circuit of said inductive winding, means responsive to change of electrical condition of the consumption circuit for affecting the inductance of the circuit of said inductive winding, and means for reversing the flux through said first-named winding during the respective alternate non-conducting periods of the supply current wave.

15. Controlling apparatus for changing the energy supplied to a consumption circuit comprising a reactor having two windings thereon adapted to be supplied from an alternating current source, rectifying means successively receiving energy from said windings respectively in alternate conducting periods interposed between alternate inactive periods and supplying energy to a consumption circuit, said windings having the flux therethrough reversed during their respective alternate inactive periods, an inductive winding on said reactor subjected to reversal of flux therethrough due to said first-named windings for thereby inducing a current in the circuit of said inductive winding, and means in the circuit of said inductive winding for adjusting the induced current in said circuit.

16. Controlling apparatus for changing the energy supplied to a consumption circuit comprising a reactor having windings thereon adapted to be supplied from an alternating current source, rectifying means successively receiving energy from said windings respectively in intermittent conducting periods interposed between intermittent inactive periods and supplying energy to a consumption circuit, said windings having the flux therethrough reversed with respect to its direction during their respective conducting periods, the reversal occurring during their respective inactive periods and existing immediately preceding their respective conducting periods, an inductive winding on said reactor subjected to reversal of flux therethrough due to said first-named windings, and means in the circuit of said inductive winding for adjusting the induced current in said circuit.

FRANK G. LOGAN.